(12) United States Patent
Zhou

(10) Patent No.: US 10,083,675 B2
(45) Date of Patent: *Sep. 25, 2018

(54) DISPLAY CONTROL METHOD AND DISPLAY CONTROL APPARATUS

(71) Applicant: Beijing Zhigu Rui Tuo Tech Co., Ltd, Beijing (CN)

(72) Inventor: Liang Zhou, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/874,640

(22) Filed: Jan. 18, 2018

(65) Prior Publication Data

US 2018/0144722 A1    May 24, 2018

Related U.S. Application Data

(63) Continuation-in-part of application No. 15/122,918, filed as application No. PCT/CN2014/095323 on Dec. 29, 2014, now Pat. No. 9,911,214.

(30) Foreign Application Priority Data

Apr. 2, 2014  (CN) .......................... 2014 1 0132376

(51) Int. Cl.
*G09G 5/14* (2006.01)
*G09G 5/12* (2006.01)
(Continued)

(52) U.S. Cl.
CPC .............. *G09G 5/14* (2013.01); *G06F 3/1423* (2013.01); *G06T 11/60* (2013.01); *G09G 5/12* (2013.01);
(Continued)

(58) Field of Classification Search
None
See application file for complete search history.

(56) References Cited

U.S. PATENT DOCUMENTS 7,495,638 B2   2/2009  Lamvik et al.
9,213,405 B2  12/2015  Perez et al.
(Continued)

FOREIGN PATENT DOCUMENTS

CN    102566756 A   7/2012
CN    103927966 A   7/2014

OTHER PUBLICATIONS

International Search Report for PCT Application No. PCT/CN2014/095323, dated Apr. 3, 2015, 4 pages.
(Continued)

*Primary Examiner* — Michelle Chin
(74) *Attorney, Agent, or Firm* — Amin, Turocy & Watson, LLP

(57) ABSTRACT

Embodiments of the present application disclose a display control method and a display control apparatus, relating to the field of near-to-eye display technologies. The method includes: determining a first display area, in the FOV of a user, of an image displayed on a main display device; and using at least one near-to-eye display device according to the first display area to display augmentation information related to the image. In the method and apparatus of the embodiments of the present application, at least one near-to-eye display device is used to supplement a display that is provided at a suitable viewing distance of a user by a device but cannot fully fill the FOV of the user, and augmentation information is used to fill the FOV of the user as far as possible, so that good immersion media viewing experience can be provided.

22 Claims, 5 Drawing Sheets

(51) Int. Cl.
*G06T 11/60* (2006.01)
*G06F 3/14* (2006.01)

(52) U.S. Cl.
CPC ... *G09G 2340/145* (2013.01); *G09G 2354/00* (2013.01)

(56) References Cited

U.S. PATENT DOCUMENTS

| | | |
|---|---|---|
| 2008/0024597 A1 | 1/2008 | Yang et al. |
| 2013/0002724 A1 | 1/2013 | Heinrich et al. |
| 2013/0033485 A1 | 2/2013 | Kollin et al. |
| 2013/0214998 A1 | 8/2013 | Andes et al. |
| 2014/0002629 A1 | 1/2014 | Ratcliff et al. |

OTHER PUBLICATIONS

Office Action dated May 18, 2017 for U.S. Appl. No. 15/122,918, 36 pages.

DISPLAY CONTROL METHOD AND DISPLAY CONTROL APPARATUS

RELATED APPLICATIONS

The present application is a continuation-in-part of, and claims priority to each of, U.S. patent application Ser. No. 15/122,918 (now U.S. Pat. No. 9,911,214), filed Aug. 31, 2016, and entitled "DISPLAY CONTROL METHOD AND DISPLAY CONTROL APPARATUS," which is a U.S. National Stage filing under 35 U.S.C. § 371 of international patent cooperation treaty (PCT) application No. PCT/CN2014/095323, filed Dec. 29, 2014, and entitled "DISPLAY CONTROL METHOD AND DISPLAY CONTROL APPARATUS", which claims the priority to Chinese Patent Application No. 201410132376.8, filed on Apr. 2, 2014, which applications are hereby incorporated into the present application herein by reference in their respective entireties.

TECHNICAL FIELD

The present application relates to the field of near-to-eye display, and in particular, to a display control method and a display control apparatus.

BACKGROUND

With the rapid popularization and a continuous increase in the network connection speed, mobile computing power, and display quality, portable devices (mobile phones, tablet computers, and so on) have become a very good entertainment platform, and consumers spend more and more time on portable devices, for example, playing games and watching videos on portable devices.

Consumers usually prefer portable devices with a relatively small size, but do not like small display screens that can only display small images. The field of view (FOV) of a human eye vision system is about 180 degree in a horizontal direction, and is about 135 degree in a vertical direction. A mobile device can display high-quality media content, but limited by a screen size, the media content may not fill the whole FOV. For example, according to a display screen size (20 cm×14 cm) of a mainstream tablet computer at present, considering that a user viewing distance is 40 cm, in the horizontal direction, only a 30-degree area of the FOV of the human eye may be filled with image content, which has a huge gap to the 180-degree horizontal FOV of the human eye.

SUMMARY

An example, non-limiting objective of the present application is to provide a display control solution.

To these and/or related ends, in a first example aspect, an embodiment of the present application provides a display control method, including:

determining a first display area, in a FOV of a user, of an image displayed on a main display device; and using at least one near-to-eye display device according to the first display area to display augmentation information related to the image.

According to a second example aspect, an embodiment of the present application provides a display control apparatus, including:

a display area determining module, configured to determine a first display area, in a FOV of a user, of an image displayed on a main display device; and a display control module, configured to use at least one near-to-eye display device according to the first display area to display augmentation information related to the image.

According to a third example aspect, an embodiment of the present application provides a near-to-eye display device, which includes the display control apparatus of the foregoing implementation manner.

In a fourth example aspect of the embodiments of the present application, a computer readable storage device is provided, comprising at least one executable instruction, which, in response to execution, causes a system comprising a processor to perform operations, comprising:

determining a first display area, in the field of view (FOV) of a user, of an image displayed on a main display device; and using at least one near-to-eye display device according to the first display area to display augmentation information related to the image.

In a fifth example aspect of the embodiments of the present application, a device for display control is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

determining a first display area, in the field of view (FOV) of a user, of an image displayed on a main display device; and using at least one near-to-eye display device according to the first display area to display augmentation information related to the image.

In one or more of the embodiments of the present application, at least one near-to-eye display device is used to supplement a display that is provided at a suitable viewing distance of a user by a device but doesn't fully fill the FOV of the user, and augmentation information is used to fill the FOV of the user as far as possible, so as to provide good immersive media viewing experience for the user and to help the user understanding the target image as well.

DETAILED DESCRIPTION

Figure 1:
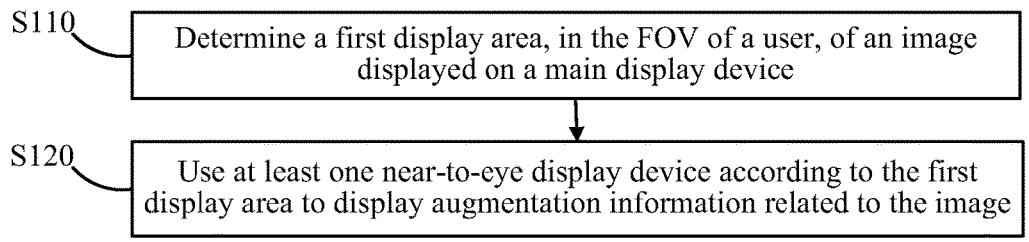
FIG. 1 is an example flowchart of a display control method according to an embodiment of the present application.

Embodiments of the present application are described in further detail below with reference to the accompanying drawings (where identical marks in several accompanying drawings represent identical elements) and embodiments. The following embodiments are used to describe the present application, but not used to limit the scope of the present application.

A person skilled in the art can understand that terminologies such as "first" and "second" in the present application are only used to distinguish different steps, devices modules, or the like, which neither represent any specific technical meaning, nor indicate any necessary logical order between steps, devices, modules, or the like.

The method and apparatus of the embodiments of the present application are used to provide immersive media viewing experience for a user who views an image (such as a text, a pattern, a video, and a game) with a device having a display function. This device is referred to as a "main display device" in the embodiments of the present application, which is an main initial device for presenting a target image to a target user, and generally refers to a device, of which a display of a target image at a suitable viewing distance of a target user doesn't fully fill the FOV of the user. The main display device could be used for presenting a real image or a virtual image of a target image. Such a device is not limited to a portable device which has a limited display screen size, for example, a mobile phone or a tablet computer, and may also include any other device which has a relatively limited display capacity as compared with image quality, for example, a desktop computer or a television. The main display device could be a near-to-eye display device as well. A near-to-eye display device is a device that can present, at a position near an eye of a user, an image provided by an image source. Such a near-to-eye display device is also referred to as a head mounted display (HMD), which is, for example, smart glasses, a helmet, or goggles. Certainly, the near-to-eye display device is not limited to a head-mounted form, and may also include other possible portable forms, such as an onboard form and a wearing form. The near-to-eye display device can present a virtual image of the image in a penetration manner at a spatial position in the FOV of the user. The position of the virtual image presented in a penetration manner is controlled, so that final imaging information on the retina of the user not only includes the image presented by the near-to-eye display device, but also includes an image presented in the rest display area of the FOV of the user, such as a background image or other images displayed by the near-to-eye display device itself or another display device. The near-to-eye display device has a relatively large display area, has relatively low costs and power consumption, and is relatively light and small. In the method of this embodiment of the present application, the at least one near-to-eye display device may include one or more near-to-eye display devices, and the near-to-eye display device may be a monocular or binocular near-to-eye display device. In addition, one near-to-eye display device may have multiple resolution values.

As shown in FIG. 1, a display control method of an embodiment of the present application includes:

S110. Determine a first display area, in the FOV of a user, of an image displayed on a main display device.

Figure 2:
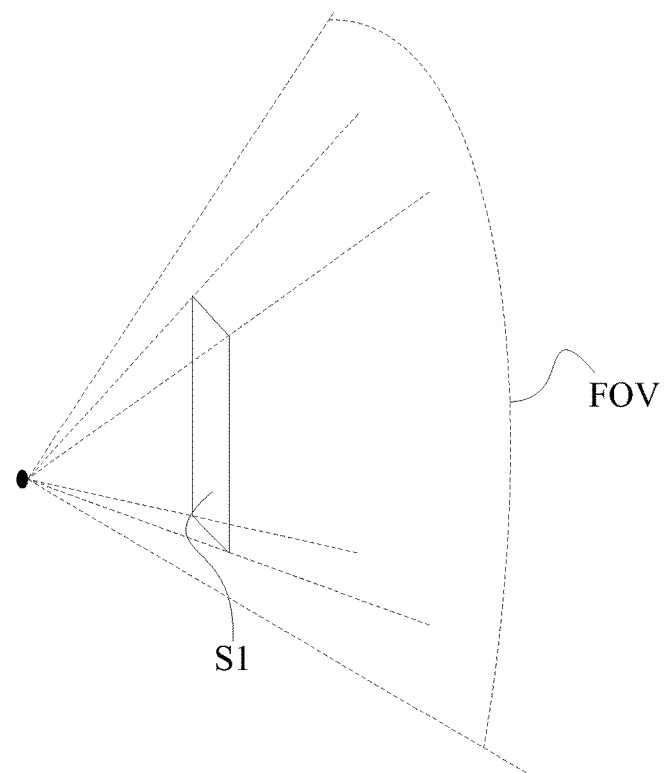
FIG. 2 is an example schematic diagram of the FOV of a user corresponding to a display of a main display device in a display control method according to an embodiment of the present application.

The FOV of a human eye vision system is about 180 degree in a horizontal direction, and is about 135 degree in a vertical direction. At a viewing distance where it is comfortable to view an image, the whole FOV of the user may be not fully filled by a display of the main display device. As shown in FIG. 2, the image displayed on the main display device fills a first display area S1 of the FOV of the user, and there is still a very large unfilled region out of the first display area S1 in the FOV of the user. In the method of this embodiment of the present application, the first display area S1 may be determined in many manners. For example, the first display area S1 is determined by detecting relative positions of the main display device and an eye of the user and with reference to the size of the main display device; or, an image formed on the fundus of the user is collected, or the image on the main display device is collected by using a near-to-eye display device, and the first display area S1 is then determined by using an image processing and analysis method.

S120. Use at least one near-to-eye display device according to the first display area to display augmentation information related to the image, so as to fill the whole FOV of the user as far as possible.

The at least one near-to-eye display device is used to display, according to the first display area, the augmentation information related to the image, so as to supplement the display of the main display device, and enhance viewing experience of the user by filling the FOV of the user as far as possible. The augmentation information is an object, a scene, prompt information, or other information that could help the user understanding the target image, and the like that are related to the image. By displaying the augmentation information, the near-to-eye display device can further provide immersive experience for the user when the user views the image displayed by the main display device.

In conclusion, in the method of this embodiment of the present application, at least one near-to-eye display device is used to supplement a display that is provided at a suitable viewing distance of a user by a device but doesn't fully fill the FOV of the user, and augmentation information can be used to fill the FOV of the user as far as possible, so as to provide good immersive media viewing experience for the user and to help the user understanding the target image as well.

Step S120 may further include:

S121: Determine, according to the first display area, a second display area of the at least one near-to-eye display device in the FOV of the user.

Figure 3A:
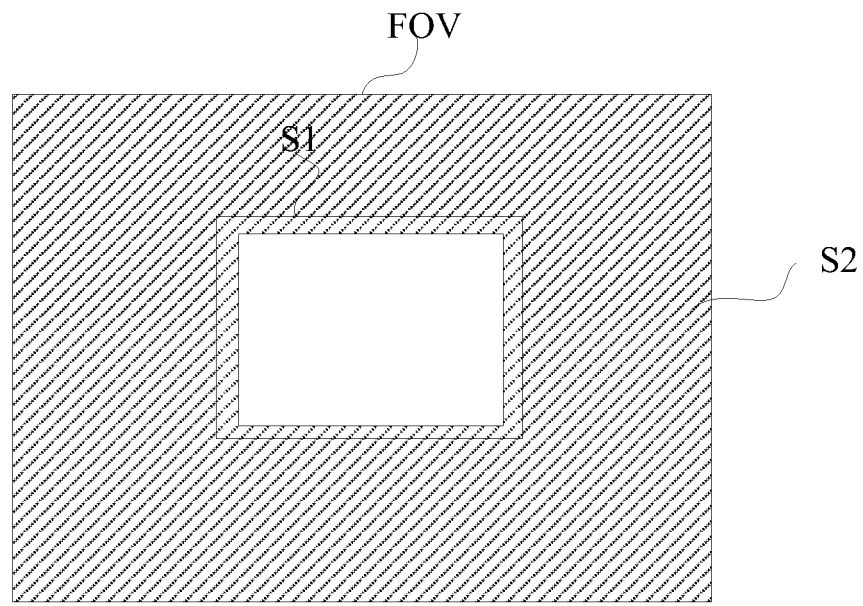
FIG. 3(a) to FIG. 3(c) are example schematic diagrams of the corresponding FOV of a user when a main display device and a near-to-eye display device perform coordinated display in a display control method according to an embodiment of the present application.
Figure 3B:
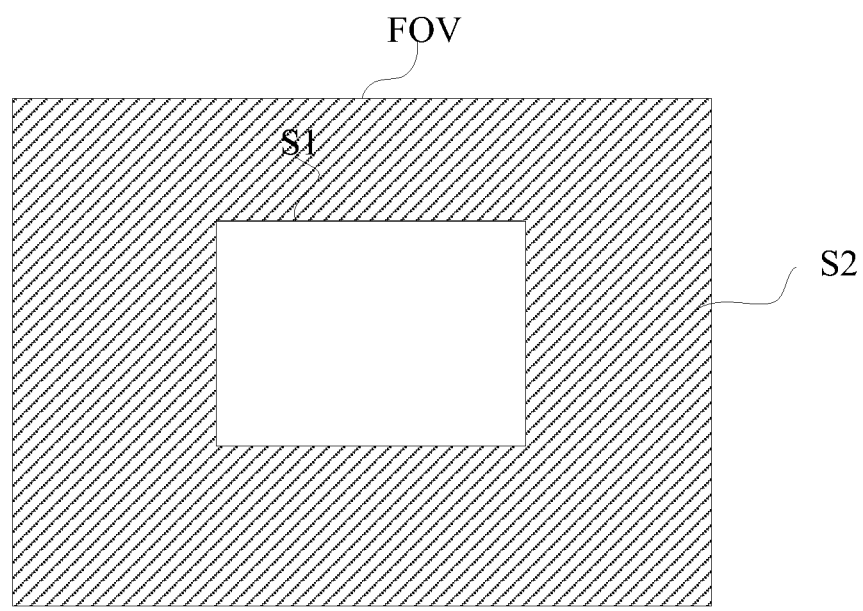
Figure 3C:
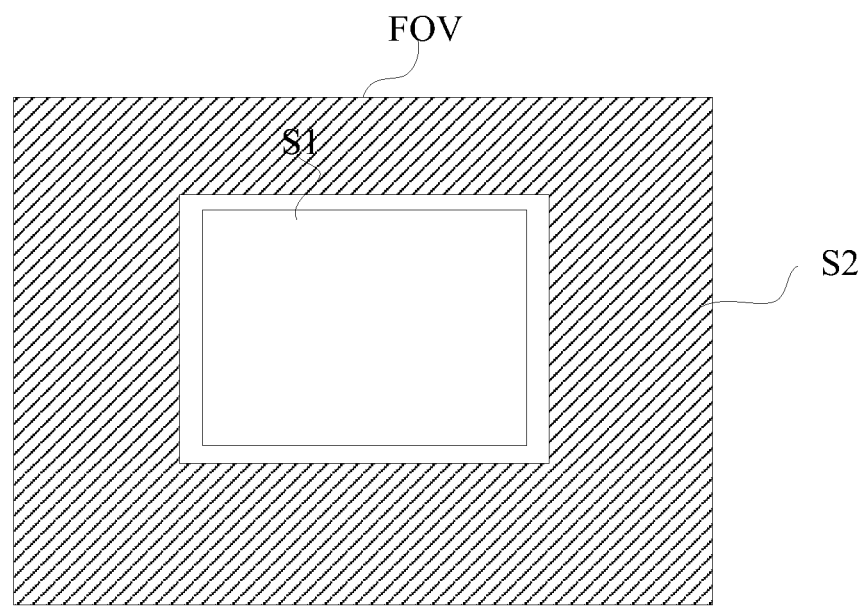

According to different degrees of viewing experience to be provided for the user, multiple possible second display areas may be determined after the first display area is determined. As shown in FIG. 3(a), a second display area S2 may include: at least a part of the first display area S1 (as shown in FIG. 3(a), the second display area includes S2 an edge part of the first display area S1, that is, the second display area S2 overlaps an edge of the first display area S1) and a region except the first display area S1 in the FOV of the user, which is indicated by oblique lines in FIG. 3(a). Further, as shown in FIG. 3(b), the second display area S2 may only include the region except the first display area S1 in the FOV of the user. It should be noted that vision of a human eye has a retina foveal feature: a human eye has different visual sensitivities within the FOV, where a foveal vision region on the retina has a high visual sensitivity (for example, the foveal vision region is sensitive to color, texture, and the like), while a peripheral vision region is more sensitive to movement information, that is, the foveal vision region is more suitable for viewing the image displayed on the main display device, while the peripheral vision region is more sensitive to the augmentation information. Therefore, the most ideal viewing experience can be provided for the user when the second display area S2 is the peripheral vision region of the user. Correspondingly, if the first display area S1 fills neither more nor less than the whole foveal vision region, the first display area S1 and the second display area S2 are next to each other when the second display area S2 is located at the peripheral vision region, as shown in FIG. 3(b); if the first display area S1 does not fill the whole foveal vision region, a gap may exist between the second display area S2 and the first display area S1, as shown in FIG. 3(c).

S122. Obtain the augmentation information according to the image.

The augmentation information is an object, a scene, and prompt information or other information that could help the user understanding the image, and the like that are related to the image. The augmentation information can provide immersive experience for the user when the user views the image. In the method of this embodiment of the present application, the augmentation information can be obtained in many manners. For example, the image may include corresponding augmentation information, and the augmentation information can be read from the image directly. The augmentation information may be determined according to content of the image, for example, the augmentation information is determined according to a feature of the image, where the feature of the image includes at least one piece of the following content: a color, brightness, texture, context, movement, a display attribute (such as a frame frequency), and so on. Determining the augmentation information according to the feature of the image may be a process of determining the augmentation information by using an algorithm related to the Augmented Reality Technique (AR) which has been mature in the field. For example, a tracking algorithm, an optical flow analysis, brightness sensing, shape sensing or the like is used to detect a change in a scene in the image, and augmentation information displayed outside a display screen of the main display device is determined with reference to an extrapolation algorithm or the like when the scene changes. For another example, context of the image is listened to and comprehended by using natural language processing (NLP), and colors and images are used to generate augmentation information that creates an immersive story environment. The augmentation information in the embodiments of the present application is mainly visual information.

S123. Use the at least one near-to-eye display device to display the augmentation information in the second display area.

After the display area and display content of the at least one near-to-eye display device are determined, the at least one near-to-eye display device can be used to display the augmentation information in the second display area, so as to provide immersive media viewing experience for the user and to help the user understanding the target image as well.

It should be noted that, in order to ensure a viewing effect, the spatial position of the augmentation information displayed by the at least one near-to-eye display device needs to be associated with the spatial position of content displayed by the main display device in terms of spatial positioning. When the user rotates or moves the main display device, the first display area changes, and the second display area of the at least one near-to-eye display device changes accordingly.

Furthermore, in one possible implementation of the present application, a combination of a real image displayed by the main display device and a virtual image displayed by the at least one near-to-eye display device may be presented to the target user finally. For example, the main display device may be a mobile phone, tablet computer, or a desktop computer, the at least one near-to-eye display is a smart glasses worn by the user. In another possible implementation of the present application, a combination of a virtual image displayed by the main display device and anther virtual image displayed by the at least one near-to-eye display device may be presented to the target user finally. In this case, the main display device may be a near-to-eye display device which could or could not be one of the at least one near-to-eye display device. However, in order that a display of the near-to-eye display device does not interfere with a display on the main display device and viewed by the user, but supplements or even improves the viewing experience, the augmentation information displayed by the at least one near-to-eye display device should be presented as naturally as possible whether it's a combination of a real image and a virtual image or of two virtual images presented finally. Therefore, in order to ensure the viewing effect, the method of this embodiment of the present application further includes:

S130. Adjust a display parameter of the at least one near-to-eye display device, so as to present the augmentation information to the user clearly and optimize an overall display effect.

The display parameter of the at least one near-to-eye display device may be adjusted according to a position relationship between the main display device and the eye of the user. For example, the augmentation information displayed by the at least one near-to-eye display device is presented in a same plane as the image displayed by the main display device, and correspondingly, the display parameter of the at least one near-to-eye display device should be adjusted according to a distance between the main display device and the eye of the user.

The display parameter of the at least one near-to-eye display device may also be adjusted according to a display feature of the main display device.

The display feature may include: curvature of a display plane of the main display device. For example, when the main display device has a curved display screen, the display parameter of the at least one near-to-eye display device should be adjusted accordingly, so that the display of the at least one near-to-eye display device and the display of the main display device can converge in a curved manner naturally and smoothly.

The display feature may further include: resolution of the main display device. According to the retina foveal feature of the human eye vision, the main display device may display the image with relatively high resolution, while the augmentation information displayed by the near-to-eye display device does not need resolution as high as that of the main display device. Therefore, resolution of the at least one near-to-eye display device may be adjusted according to the resolution of the main display device, for example, the resolution of the at least one near-to-eye display device is adjusted lower than the resolution of the main display device.

It can be understood by a person skilled in the art that, in the foregoing method of the embodiments of the present application, sequence numbers of the steps do not mean execution order, and the execution order of the steps should be determined by functions and internal logic of the steps, and should not constitute any limit to an implementation process of the embodiments of the present application.

Figure 4:
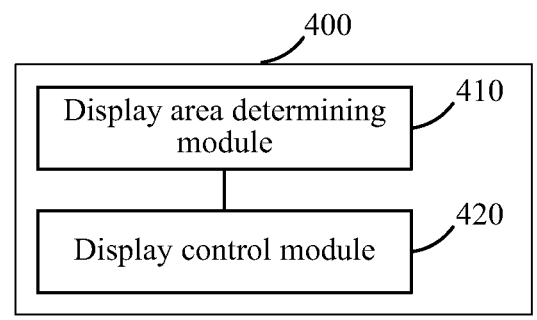
FIG. 4 is an example schematic structural diagram of a display control apparatus according to an embodiment of the present application.

An embodiment of the present application further provides a display control apparatus, and the apparatus is used to provide immersive media viewing experience for a user that uses a main display device to view an image (such as a text, a pattern, a video, and a game). The apparatus may be the main display device or a near-to-eye display device, and may also be a part of the main display device or the near-to-eye display device, or a third-party device that is independent of the main display device and the near-to-eye display device, or partly belong to the main display device or the near-to-eye display device. As shown in FIG. 4, a display control apparatus 400 of this embodiment of the present application includes: a display area determining module 410 and a display control module 420.

The display area determining module 410 is configured to determine a first display area, in the FOV of a user, of an image displayed on a main display device.

The FOV of a human eye vision system is about 180 degree in a horizontal direction, and is about 135 degree in a vertical direction. At a viewing distance where it is comfortable to view an image, the whole FOV of the user may be not fully filled by a display of the main display device. As shown in FIG. 2, the image displayed on the main display device fills a first display area S1 of the FOV of the user, and there is still a very large unfilled region out of the first display area S1 in the FOV of the user. In the apparatus of this embodiment of the present application, the display area determining module 410 may determine the first display area S1 in many manners. For example, the display area determining module 410 determines the first display area S1 by detecting relative positions of the main display device and an eye of the user and with reference to the size of the main display device; or, by collecting an image formed on the fundus of the user, or collecting the image on the main display device by using a near-to-eye display device, the display area determining module 410 determines the first display area S1 by using an image processing and analysis method.

The display control module 420 is configured to use at least one near-to-eye display device according to the first display area to display augmentation information related to content of the image, so as to fill the whole FOV of the user as far as possible.

The display control module 420 uses at least one near-to-eye display device to display, according to the first display area, the augmentation information related to the image, so as to supplement the display of the main display device, and enhance viewing experience of the user by filling the FOV of the user as far as possible. The augmentation information is an object, a scene, prompt information, or other information that could help the user understanding the target image, and the like that are related to the image. By displaying the augmentation information, the near-to-eye display device can further provide immersive experience for the user when the user views the image displayed by the main display device.

In conclusion, the apparatus of this embodiment of the present application uses at least one near-to-eye display device to supplement a display that is provided at a suitable viewing distance of a user by a device but doesn't fully fill the FOV of the user, and can use augmentation information to fill the FOV of the user as far as possible, so as to provide good immersive media viewing experience for the user and to help the user understanding the target image as well.

Figure 5:
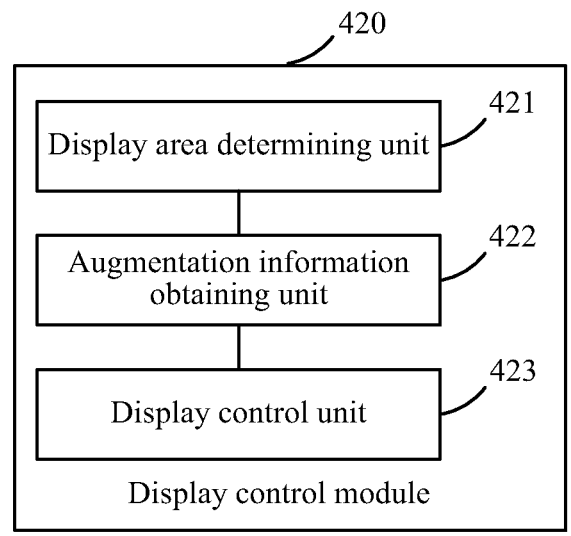
FIG. 5 is an example schematic structural diagram of a display control module in a display control apparatus according to an embodiment of the present application.
Figure 6:
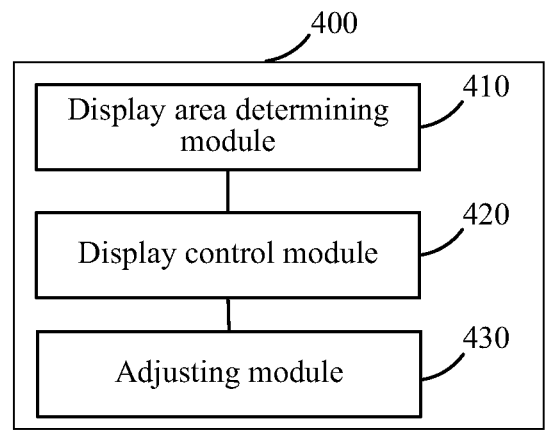
FIG. 6 is an example schematic structural diagram of another display control apparatus according to an embodiment of the present application.

As shown in FIG. 5, the display control module 420 may further include: a display area determining unit 421, an augmentation information obtaining unit 422, and a display control unit 423.

The display area determining unit 421, configured to determine a second display area of the at least one near-to-eye display device in the FOV of the user according to the first display area.

According to different degrees of viewing experience to be provided for the user, after the first display area is determined, the display area determining unit 421 may determine multiple possible second display areas. As shown in FIG. 3(*a*), a second display area S2 may include: at least a part of the first display area S1 (as shown in FIG. 3(*a*), the second display area includes S2 an edge part of the first display area S1, that is, the second display area S2 overlaps an edge of the first display area S1) and a region except the first display area S1 in the FOV of the user, which is indicated by oblique lines in FIG. 3(*a*). Further, as shown in FIG. 3(*b*), the second display area S2 may only include the region except the first display area S1 in the FOV of the user. It should be noted that vision of a human eye has a retina foveal feature: a human eye has different visual sensitivities within the FOV, where a foveal vision region on the retina has a high visual sensitivity (for example, the foveal vision region is sensitive to colors, texture, and the like), while a peripheral vision region is more sensitive to movement information, that is, the foveal vision region is more suitable for viewing the image displayed on the main display device, while the peripheral vision region is more sensitive to the augmentation information. Therefore, the most ideal viewing experience can be provided for the user when the second display area S2 is the peripheral vision region of the user. Correspondingly, if the first display area S1 fills neither more nor less than the whole foveal vision region, the first display area S1 and the second display area S2 are next to each other when the second display area S2 is located at the peripheral vision region, as shown in FIG. 3(*b*); if the first display area S1 does not fill the whole foveal vision region, a gap may exist between the second display area S2 and the first display area S1, as shown in FIG. 3(*c*).

The augmentation information obtaining unit 422 is configured to obtain the augmentation information according to the image.

The augmentation information is an object, a scene, and prompt information or other information that could help the user understanding the image, and the like that are related to the image. The augmentation information can provide immersive experience for the user when the user views the image. In the apparatus of this embodiment of the present application, the augmentation information obtaining unit 422 can obtain the augmentation information in many manners. For example, if the image may include corresponding augmentation information, the augmentation information obtaining unit 422 directly reads the augmentation information from the image, and correspondingly, the apparatus of this embodiment of the present application may include a communications module configured to obtain the augmentation information, where the communications module may communicate with the main display device or communicate with the near-to-eye display device to obtain the augmentation information. The augmentation information obtaining unit 422 may determine the augmentation information according to content of the image, for example, determine the augmentation information according to a feature of the image, where the feature of the image includes at least one piece of the following content: a color, brightness, texture, context, movement, a display attribute (such as a frame frequency), and so on. Determining the augmentation information according to the feature of the image may be a process of determining the augmentation information by using an algorithm related to the AR technique which has been mature in the field. For example, a tracking algorithm, an optical flow analysis, brightness sensing, shape sensing or the like is used to detect a change in a scene in the image, and augmentation information displayed outside a display screen of the main display device is determined with reference to an extrapolation algorithm or the like when the scene changes. For another example, context of the image is listened to and comprehended by using NLP, and colors and images are used to generate augmentation information that creates an immersive story environment. Correspondingly, to obtain the augmentation information, the augmentation information obtaining unit 422 may include or use some modules or units of the near-to-eye display device to obtain the image displayed on the main display device, so as to determine the augmentation information. The augmentation information in the embodiments of the present application is mainly visual information.

The display control unit 423 is configured to use the at least one near-to-eye display device to display the augmentation information in the second display area.

After the display area and display content of the at least one near-to-eye display device are determined, the at least one near-to-eye display device can be used to display the augmentation information in the second display area, so as to provide immersive media viewing experience for the user and to help the user understanding the target image as well.

It should be noted that, in order to ensure a viewing effect, the spatial position of the augmentation information displayed by the at least one near-to-eye display device needs to be associated with the spatial position of content displayed by the main display device. When the user rotates or moves the main display device, the first display area changes, and the second display area displayed by the at least one near-to-eye display device changes accordingly.

Furthermore, in one possible implementation of the present application, a combination of a real image displayed by the main display device and a virtual image displayed by the at least one near-to-eye display device may be presented to the target user finally. For example, the main display device may be a mobile phone, tablet computer, or a desktop computer, the at least one near-to-eye display is a smart glasses worn by the target user. In another possible implementation of the present application, a combination of a virtual image displayed by the main display device and anther virtual image displayed by the at least one near-to-eye display device may be presented to the target user finally. In this case, the main display device may be a near-to-eye display device which could or could not be one of the at least one near-to-eye display device or not. However, in order that a display of the near-to-eye display device does not interfere with a display on the main display device and viewed by the user, but supplements or even improves the viewing experience, the augmentation information displayed by the at least one near-to-eye display device should be presented as naturally as possible whether it's a combination of a real image and a virtual image or of two virtual images presented finally. Therefore, in order to ensure the viewing effect, the apparatus of this embodiment of the present application further includes:

an adjusting module 430, configured to adjust a display parameter of the at least one near-to-eye display device, so as to present the augmentation information to the user clearly.

The display parameter of the at least one near-to-eye display device may be adjusted according to a position relationship between the main display device and the eye of the user. For example, the augmentation information displayed by the at least one near-to-eye display device is presented in a same plane as the image display by the main display device, and correspondingly, the display parameter of the at least one near-to-eye display device should be adjusted according to a distance between the main display device and the eye of the user.

The display parameter of the at least one near-to-eye display device may also be adjusted according to a display feature of the main display device.

The display feature may include: curvature of a display plane of the main display device. When the main display device has a curved display screen, the display parameter of the at least one near-to-eye display device should be adjusted accordingly, so that the display of the at least one near-to-eye display device and the display of the main display device can converge naturally and smoothly.

The display feature may further include: resolution of the main display device. According to the retina foveal feature of the human eye vision, the main display device may display the image with relatively high resolution, while the augmentation information displayed by the near-to-eye display device does not necessarily need resolution as high as that of the main display device. Resolution of the at least one near-to-eye display device may be adjusted according to the resolution of the main display device, for example, the resolution of the at least one near-to-eye display device is adjusted smaller than the resolution of the main display device.

Figure 7:
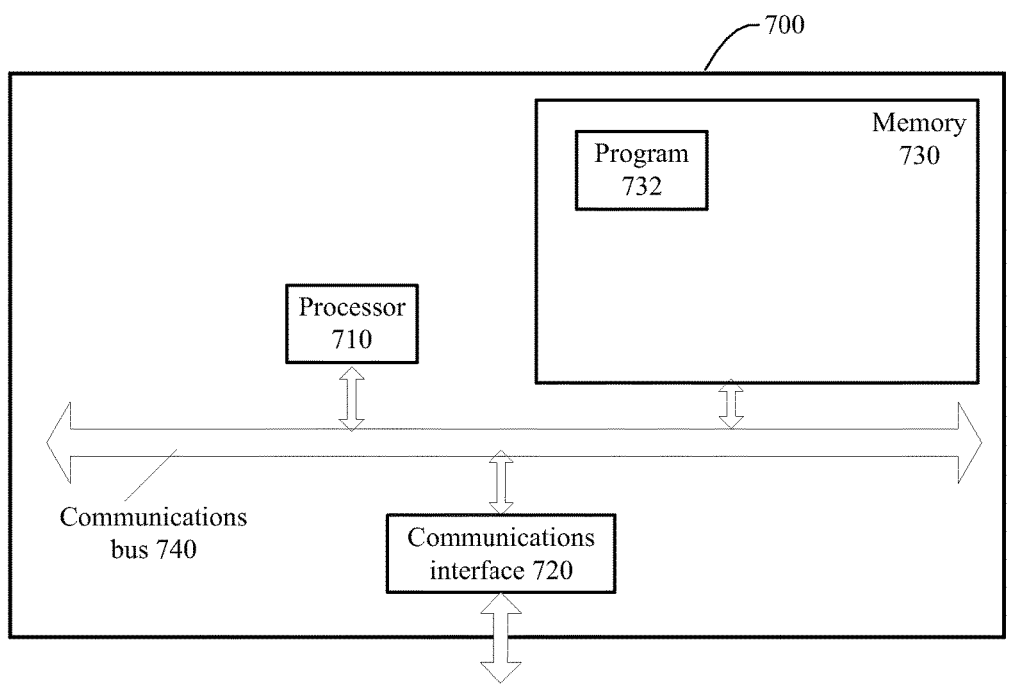
FIG. 7 is an example schematic structural diagram of still another display control apparatus according to an embodiment of the present application.

FIG. 7 is a schematic structural diagram of still another display control apparatus 700 according to an embodiment of the present application. Example implementation of the display control apparatus 700 is not limited by this embodiment of the present application. As shown in FIG. 7, the display control apparatus 700 may include:

a processor 710, a communications interface 720, a memory 730, and a communications bus 740.

The processor 710, the communications interface 720, and the memory 730 communicate with each other through the communications bus 740.

The communications interface 720 is configured to communicate with a network element such as a client.

The processor 710 is configured to execute a program 732, and specifically may execute relevant steps in the foregoing method embodiment.

Specifically, the program 732 may include program code, where the program code includes a computer operation instruction.

The processor 710 may be a central processing unit (CPU), or an application specific integrated circuit (ASIC), or may be configured as one or more integrated circuits that implement the embodiments of the present application.

The memory 730 is configured to store the program 732. The memory 730 may include a high speed random access memory (RAM), also may further include a non-volatile memory, such as at least one disk memory. The program 732 may specifically be configured to enable the display control apparatus 700 to execute the following steps:

determining a first display area, in the FOV of a user, of an image displayed on a main display device; and using at least one near-to-eye display device according to the first display area to display augmentation information related to the image.

For example implementation of the steps in the program 732, reference may be made to corresponding descriptions in corresponding steps and units in the foregoing embodiments, and details are not described herein again. It can be clearly known by a person skilled in the art that, to make the description convenient and concise, for specific working processes of the devices and modules described above, reference may be made to corresponding process descriptions in the foregoing method embodiments, and details are not described herein again.

Figure 8:
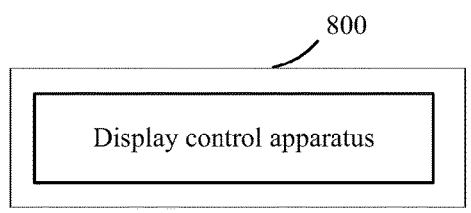
FIG. 8 is an example schematic structural diagram of a near-to-eye display device according to an embodiment of the present application.

As shown in FIG. 8, an embodiment of the present application further provides a near-to-eye display device 800, including the display control apparatus in the embodiments shown in FIG. 4 to FIG. 7.

In the embodiment of the present aspect, the near-to-eye display device may be smart glasses, a helmet, goggles, and so on.

It can be realized by a person of ordinary skill in the art that, units and method steps described with reference to the embodiments disclosed in this specification can be implemented by electronic hardware or a combination of computer software and electronic hardware. Whether these functions are actually executed in a hardware or software form depends on specific applications and design constraints of the technical solution. A person skilled in the art may use different methods to implement the described function for each specific application, but such implementation should not be considered beyond the scope of the present application.

If the function is implemented in a form of a software functional unit and is sold or used as an independent product, the product can be stored in a computer-readable storage medium. Based on this understanding, the technical solution of the present application essentially, or a part of the technical solution, that contributes to the prior art, or a part of the technical solution may be embodied in a form of a software product; the computer software product is stored in a storage medium and includes a number of instructions that enable a computer device (which may be a personal computer, a server, a network device, or the like) to execute all or some of the steps of the method in the embodiments of the present application. The foregoing storage medium includes all kinds of mediums that can store program code, such as a USB flash drive, a mobile hard disk, a read-only memory (ROM), a RAM, a magnetic disk, or a compact disc.

The foregoing embodiments are only used to describe the present application, but not to limit the present application. A person of ordinary skill in the art can still make various alterations and modifications without departing from the spirit and scope of the present application; therefore, all equivalent technical solutions also fall within the scope of the present application, and the patent protection scope of the present application should be subject to the claims.

What is claimed is:

1. A method, comprising:
    determining, by a device comprising a processor, a first display area, in a field of view (FOV) of a user, of an image displayed on a main display device; and
    using at least one near-to-eye display device according to the first display area to display augmentation information related to the image.

2. The method of claim 1, wherein the using the at least one near-to-eye display device comprises:
    determining, according to the first display area, a second display area of the at least one near-to-eye display device in the FOV of the user;
    obtaining the augmentation information according to the image; and
    using the at least one near-to-eye display device to display the augmentation information in the second display area.

3. The method of claim 2, wherein the second display area comprises: at least a part of the first display area and a region except the first display area in the FOV of the user.

4. The method of claim 2, wherein the second display area comprises: a region except the first display area in the FOV of the user.

5. The method of claim 4, wherein the second display area comprises: a peripheral vision region of the user.

6. The method of claim 2, wherein the obtaining the augmentation information according to the image comprises:
    obtaining the augmentation information according to a feature of the image.

7. The method of claim 6, wherein the feature of the image comprises at least one of a color, brightness, texture, context, movement, or a display attribute.

8. The method of claim 1, further comprising:
    adjusting a display parameter of the at least one near-to-eye display device.

9. The method of claim 8, wherein the adjusting the display parameter of the at least one near-to-eye display device comprises:
    adjusting the display parameter of the at least one near-to-eye display device according to a position relationship between the main display device and an eye of the user.

10. The method of claim 8, wherein the adjusting the display parameter of the at least one near-to-eye display device comprises:
    adjusting the display parameter of the at least one near-to-eye display device according to a display feature of the main display device.

11. The method of claim 10, wherein the display feature comprises: a curvature of a display screen of the main display device.

12. The method of claim 10, wherein the display feature comprises: a resolution of the main display device.

13. The method of claim 1, wherein the augmentation information comprises at least one of an object, a scene or prompt information that are related to content of the image.

14. An apparatus, comprising:
    a processor, coupled to a memory, that executes or facilitates execution of executable modules, comprising:
    a display area determining module configured to determine a first display area, in a field of view (FOV) of a user, of an image displayed on a main display device; and
    a display control module configured to use at least one near-to-eye display device according to the first display area to display augmentation information related to the image.

15. The apparatus of claim 14, wherein the display control module comprises:

a display area determining unit configured to determine, according to the first display area, a second display area of the at least one near-to-eye display device in the FOV of the user;

an augmentation information obtaining unit configured to obtain the augmentation information according to the image; and a display control unit configured to use the at least one near-to-eye display device to display the augmentation information in the second display area.

16. The apparatus of claim 15, wherein the augmentation information obtaining unit obtains the augmentation information according to a feature of the image.

17. The apparatus of claim 14, wherein the executable modules further comprise:

an adjusting module configured to adjust a display parameter of the at least one near-to-eye display device.

18. The apparatus of claim 17, wherein the adjusting module adjusts the display parameter of the at least one near-to-eye display device according to a position relationship between the main display device and an eye of the user.

19. The apparatus of claim 17, wherein the adjusting module adjusts the display parameter of the at least one near-to-eye display device according to a display feature of the main display device.

20. A near-to-eye display device, comprising the apparatus of claim 14.

21. A non-transitory computer readable medium, comprising at least one executable instruction, which, in response to execution, causes a system comprising a processor to perform operations, comprising:

determining a first display area, in a field of view (FOV) of a user, of an image displayed on a main display device; and using at least one near-to-eye display device according to the first display area to display augmentation information related to the image.

22. A device for display control, comprising a processor and a memory, wherein the memory stores executable instructions, the processor being connected with the memory via a communication bus, and when the device is operating, the processor executes or facilitates execution of the executable instructions stored by the memory to cause the device to perform operations, comprising:

determining a first display area, in a field of view (FOV) of a user, of an image displayed on a main display device; and using at least one near-to-eye display device according to the first display area to display augmentation information related to the image.

* * * * *